United States Patent [19]

Elms et al.

[11] Patent Number: 5,038,372
[45] Date of Patent: Aug. 6, 1991

[54] SYSTEMS FOR TRANSMITTING DATA VIA TELEPHONE LINES

[75] Inventors: Robert T. Elms, Monroeville, Pa.; Robert G. Colclaser, III, Grafton, Mass.

[73] Assignee: ABB Power T & D Company, Inc., Blue Bell, Pa.

[21] Appl. No.: 402,727

[22] Filed: Sep. 5, 1989

[51] Int. Cl.⁵ .......................................... H04M 11/00
[52] U.S. Cl. ...................................... 379/94; 379/377
[58] Field of Search ............... 379/107, 106, 92, 93, 379/98, 96, 97, 100, 377, 385

[56] References Cited

U.S. PATENT DOCUMENTS

| | | | |
|---|---|---|---|
| 3,564,143 | 2/1971 | Stewart, Jr. | 379/107 |
| 4,002,837 | 1/1977 | Ebner et al. | 379/107 |
| 4,059,727 | 11/1977 | Kingswell et al. | 379/107 |
| 4,394,540 | 7/1983 | Willis et al. | 379/107 |
| 4,469,917 | 9/1984 | Shelley | 379/107 |
| 4,540,849 | 9/1985 | Oliver | 379/107 |
| 4,811,389 | 3/1989 | Balch | 379/107 |
| 4,833,618 | 5/1989 | Verma et al. | 379/107 |
| 4,958,371 | 9/1990 | Damoci et al. | 379/107 |

*Primary Examiner*—Jin F. Ng
*Assistant Examiner*—Stella L. Woo
*Attorney, Agent, or Firm*—A. J. Rossi

[57] ABSTRACT

A system for transmitting data via a telephone line by means of a data communications device (4) connected to the telephone line, at least one other communications device being connected to the telephone line and each device being switchable between an inactive state, in which the device is not in use and presents a high impedance to the telephone line, and an active state, in which the device reduces the telephone line voltage and signals can be transferred between the device and the telephone line, the system including a telephone line state detection unit (10) associated with the data communications device (4) and connected to the telephone line for electrically monitoring the telephone line to provide an indication of the state of another communications device connected to the telephone line.

7 Claims, 3 Drawing Sheets

SYSTEMS FOR TRANSMITTING DATA VIA TELEPHONE LINES

BACKGROUND OF THE INVENTION

The present invention relates to systems for transmitting data via telephone lines, particularly automated systems which share a telephone line with other users.

Systems using consumer telephone lines for exchanging data with remote locations have recently been proposed. One specific application of such systems is the transmission of utility meter readings and thermostat settings from homes to a central data collection station, thereby eliminating the need for personal visits by meter readers. In such systems, it is also possible to transmit from the central station to the homes information about time-related energy costs, thereby enabling the energy usage in the home to be adjusted, either manually or automatically, to minimize energy costs. Such information would be particularly useful if electrical utilities should adopt the practice of varying their kilowatt-hour charge as a function of total demand, maximum rates being charged during periods of peak demand and lower rates being charged during periods of reduced demand.

Particularly in the case of home installations, such systems would require access to a telephone line for only brief, widely spaced periods of time. For example, if the system is arranged only to perform meter readings, data transfer might occur only once or twice each month, with each transfer operation requiring access to the telephone line for a period of several minutes. Under these circumstances, it would not be economically feasible for the electrical power utility to have a separate telephone line connected to each home.

However, if data transfer is effected via a telephone line already connected to the home, it would be highly desirable, if not indispensable, that the data transfer system not interfere with normal use of the telephone line by individuals in the home.

SUMMARY OF THE INVENTION

It is an object of the present invention to control the operation of such a system so as to not interfere with normal use of the telephone line to which the system is connected.

Another object of the invention is to give priority of use of the telephone line to subscribers.

A more specific object of the invention is to prevent connection of the system to a telephone line which is already in use.

Still another object of the invention is to terminate a data transfer operation and disconnect the data transfer system from the telephone line if another instrument connected to the line is put into use during the course of a data transfer operation.

The above and other objects are achieved, according to the present invention, in a system for transmitting data via a telephone line by means of a data communications device connected to the telephone line, at least one other communications device being connected to the telephone line and each device being switchable between an inactive state in which the device is not in use and an active state in which signals can be transferred between the device and the telephone line, by the provision of telephone line state detection means associated with the data communications device and connected to the telephone line for electrically monitoring the telephone line to provide an indication of the state of any other communications device connected to the telephone line.

Thus, with a system according to the present invention, the telephone line is monitored to determine whether another instrument connected to the line is in use or is being put into use, in which case, the start of a data transfer operation is postponed or an ongoing data transfer operation is, aborted.

DESCRIPTION OF THE PREFERRED EMBODIMENTS

Figure 1:
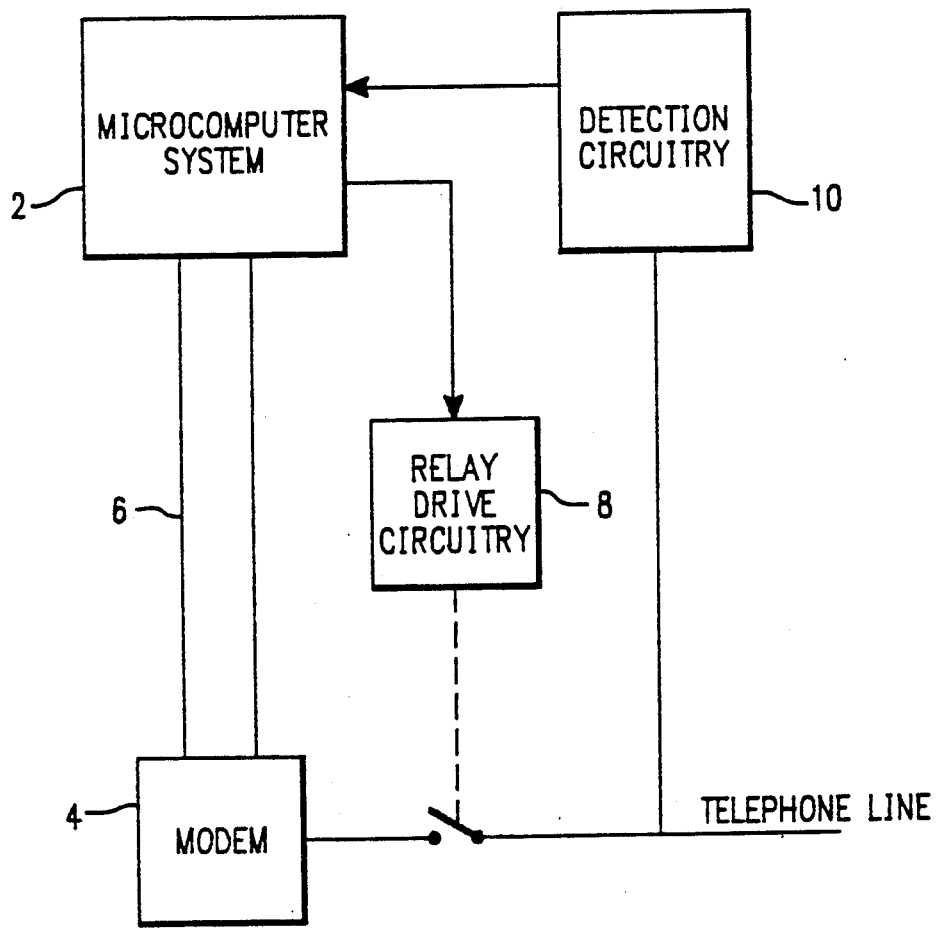
FIG. 1 is a block diagram showing a monitoring and connection control unit arranged to control the connection of a data transfer communication system to a telephone line.

The assembly shown in FIG. 1 includes a data transfer communication installation composed essentially of a microcomputer system 2 and a modem 4. System 2 and modem 4 may be constituted by a communication server of the type developed by the Westinghouse Electric Corporation and presently identified by the tradename "Comset 2000". Such an installation is intended to be associated with various peripheral devices such as, for example, specially designed "smart" electric meters containing electronic data exchange modules, "smart" relays and "smart" thermostats also equipped with electronic data exchange modules capable of receiving information concerning time-related energy unit charges. Microcomputer system 2 is constructed to control the exchange of data between the meter and thermostat, or thermostats, connected thereto, and a remote data gathering system, via the telephone line.

Modem 4 is coupled to microcomputer system 2 via a bidirectional bus 6 which carries signals for controlling the operation of the modem and indicating the modem operating state. In addition, according to the invention, bus 6 carries the modem signal which would be conventionally used to drive a relay to couple modem 4 to the telephone line.

Thus, in contrast to conventional data communication systems in which the connection to the telephone line is controlled directly by the modem, the present invention provides for control of the connection between the modem and the telephone line by means of microcomputer system 2 via relay drive circuitry 8 in response to a signal provided by detection circuitry 10 which is connected to the telephone line to determine its availability.

Detection circuitry 10 includes a first circuit unit which will provide a signal indicative of whether the telephone line is available prior to a data transfer being initiated and a second circuit unit which will provide an indication if a subscriber begins using an instrument connected to the same telephone line while a data transfer operation is in progress.

Figure 2:
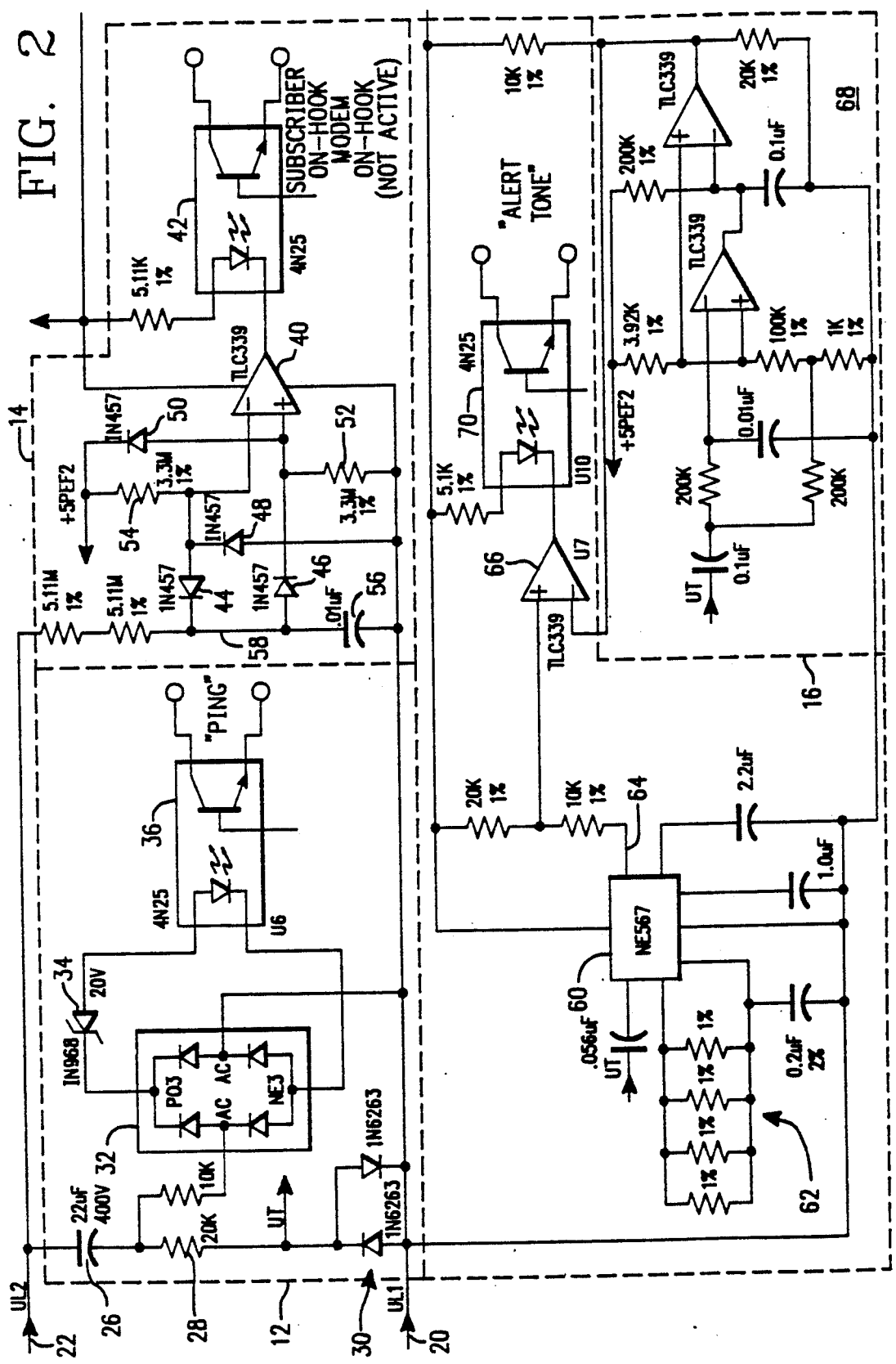
FIG. 2 is a circuit diagram of a preferred embodiment of one circuit arrangement of a unit according to the present invention.

A preferred embodiment of the first circuit unit is illustrated in FIG. 2. This circuit is composed of three basic units: a ring detector 12 which provides an indication of an incoming call, i.e., a telephone ring signal; an on-hook detector circuit 14 which provides an output if all communications equipment connected to the telephone line, including modem 4 and all telephone instruments, are in their inactive state; and an "alert tone" detector 16 which provides an indication of the arrival of a special calling signal from the remote system which is arranged to communicate with modem 4.

The circuit shown in circuit 2 includes two inputs 20 and 22 connected to the conductors of a telephone line to be at the potentials UL1 and UL2, respectively. These conductors are commonly known in the telephone industry as "tip" and "ring" lines. Potential UL1 constitutes the reference, or ground, potential for the circuit unit.

The input of detector 12 is constituted by a series arrangement of a capacitor 26, a resistor 28 and a diode pair 30, the diodes of which are connected together in parallel opposition. The purpose of diode pair 30 is to clip ring signals in order to prevent those signals from damaging components of detector 16.

In a telephone system, there is provided between conductors 20 and 22 a DC bias voltage as well as alternating voltages constituting ring signals, busy signals, dial tones and voice signals. The DC bias voltage will have a nominal amplitude of ±48 V when all devices connected to the telephone line are inactive, i.e., are on-hook. If a device connected to the telephone lines is on-hook, it must present an impedance of at least 10 MΩ between conductors 20 and 22; if the device is placed in service, i.e., is off-hook, it must, according to AT&T regulations, either draw at least 26 mA or reduce the magnitude of the voltage across the telephone lines to less than 11.2 V. It can safely be assumed that any telephone device will reduce the line voltage to no more than about ±10 V DC.

A full wave rectifier bridge 32 has its AC inputs connected between line 20 and the point of connection between capacitor 26 and resistor 28.

Capacitor 26 and resistor 28 function as a high pass filter so that when only a DC voltage is present between conductors 20 and 22, the voltage between the input terminals of bridge 32 will be negligibly small and will, in any event, be lower than the breakdown voltage of a Zener diode 34 connected in series with the DC outputs of bridge 32.

If, on the other hand, an alternating ring signal appears between conductors 22 and 20, this will create a DC voltage across the output terminals of bridge 32 which is substantially greater than the reverse breakdown voltage of Zener diode 34.

Connected in series with Zener diode 34 is an input photodiode of an optoelectronic isolator 36 which further includes a phototransistor optically coupled to the photodiode. Upon the occurrence of a ring signal, the voltage at the output of bridge 32 is sufficient to drive the photodiode of isolator 36 to an extent sufficient to cause the phototransistor of isolator 36 to output a ring signal.

Detection circuit 14 includes, at its input, a series arrangement of resistors and a capacitor which provide the requisite on-hook impedance between conductors 20 and 22. Circuit 14 further includes a differential amplifier 40 and an optoelectronic isolator 42 whose input photodiode is connected between the output of amplifier 40 and a DC bias voltage source.

Amplifier 40 is constructed such that when the potential at its noninverting input is more positive than the potential at its inverting input, the amplifier output is at ground potential, resulting in a current flow through the photodiode of isolator 42 sufficient to produce a light output which will generate a detectable output signal across the output terminals provided by the phototransistor of isolator 42.

The signal input to circuit 14 is provided at the point of connection 58 between the resistors and the capacitor of the series arrangement at the input to circuit 14. The input potentials to amplifier 40 are supplied by a network composed of diodes 44, 46, 48 and 50, resistors 52 and 54 and capacitor 56.

Diode 44 is connected in series between point 58 and the inverting input of amplifier 40, diode 46 is connected in series between point 58 and the noninverting input of amplifier 40, diode 48 is connected between the inverting input of amplifier 40 and conductor 20, and diode 50 is connected between a point providing a DC reference voltage, in this case having a value of +5 V, and the noninverting input of amplifier 40. All of these diodes are poled as illustrated.

Resistor 52 is connected between the noninverting input of amplifier 40 and conductor 20, resistor 54 is connected between the reference voltage point and the inverting input of amplifier 40, and capacitor 56 is connected between connection point 58 and conductor 20.

This circuit arrangement is provided to enable circuit 14 to detect the DC voltage level between conductors 22 and 20 regardless of the polarity of this voltage.

If the potential on conductor 22 is positive with respect to the potential on conductor 20, diodes 44 and 48 will be reverse biased and there will be no current flow through resistor 54, so that the inverting input of amplifier 40 will be biased to the reference potential of +5 V. Diode 46 will be forward biased so that resistor 52 will form a voltage divider with the two resistors of the series arrangement at the circuit input. Therefore, isolator 42 will produce an output signal indicating that all instruments connected to the telephone line, including modem 4 (FIG. 1) are inactive (on-hook) if the potential at the noninverting input of amplifier 40 is greater than +5 V.

The values of the resistors in the series arrangement at the circuit input and the value of resistor 52 are selected so that the voltage across resistor 52 is approximately one-fourth the voltage between conductors 22 and 20. Therefore, if UL2 has a value of > +20 volts relative to UL1, an on-hook signal will be produced at the output of isolator 42.

If UL2 is negative relative to UL1, UL2 will also be negative with respect to the +5 V reference voltage, so that diode 44 will be forward biased and a voltage divider will be formed by resistor 54 and the two resistors in the series arrangement at the circuit input. In addition, diode 46 will be reverse biased so that the potential UL1 will be present at the noninverting input of amplifier 40. The output signal from amplifier 40 will produce an on-hook signal at the output of isolator 42 if the potential at the inverting input of amplifier 40 is negative relative to UL1.

As will be seen, this condition will exist if UL2 is more negative than −15 volts relative to UL1. With diode 44 forward biased, one end of the voltage divider formed by resistor 54 and the two resistors in the series arrangement at the circuit input will be at the potential +5 and the other end of the divider will be at UL2. If the resistance of resistor 54 is approximately one-fourth the total resistance of the voltage divider, the potential at the inverting input of amplifier 40 will be positive if UL2 has a potential of between 0 and −15 V. If UL2 is more negative than −15 V, then the potential at the inverting input of amplifier 40 will be negative and an on-hook signal will be produced at the output of isolator 42.

Thus, since an instrument which is off-hook, or a modem connected to the telephone line, loads the telephone line to a DC voltage of less than 15 V, circuit 14 will produce an on-hook signal only if all instruments connected to the telephone line are on-hook.

Alert tone detector 16 is constructed to detect the arrival, on the telephone line, of a special tone produced by the remote system, for example to indicate to the communication system associated with modem 4 that a data transfer operation is to be initiated. This circuit does not constitute a novel element of the present invention, and is illustrated only for the sake of completeness. Detector 16 includes an integrated circuit 60 connected to receive an alert tone signal VT which will be derived from a point between resistor 28 and diode pair 30 of the input circuit to detector 12. Circuit 60 is further connected to a frequency sensing unit 62 which causes circuit 60 to produce a signal at its output terminal 64 when the signal UT has a selected frequency, this output signal being arranged to reduce the potential appearing at the noninverting input of a differential amplifier 66.

Detector 16 further includes a threshold detector and pulse stretcher 68 which is also connected to receive signal UT and responds to a signal whose magnitude exceeds a selected threshold value to supply to the inverting input of amplifier 66 a positive potential which is greater than the potential at the noninverting input when output terminal 64 is producing an output signal. Under these circumstances, the output signal from amplifier 66 will cause optoelectronic isolator 70 to produce an alert tone output signal. Since pulse stretcher 68 does not form a novel form of the present invention, its operation will not be described in greater detail herein.

Figure 3:
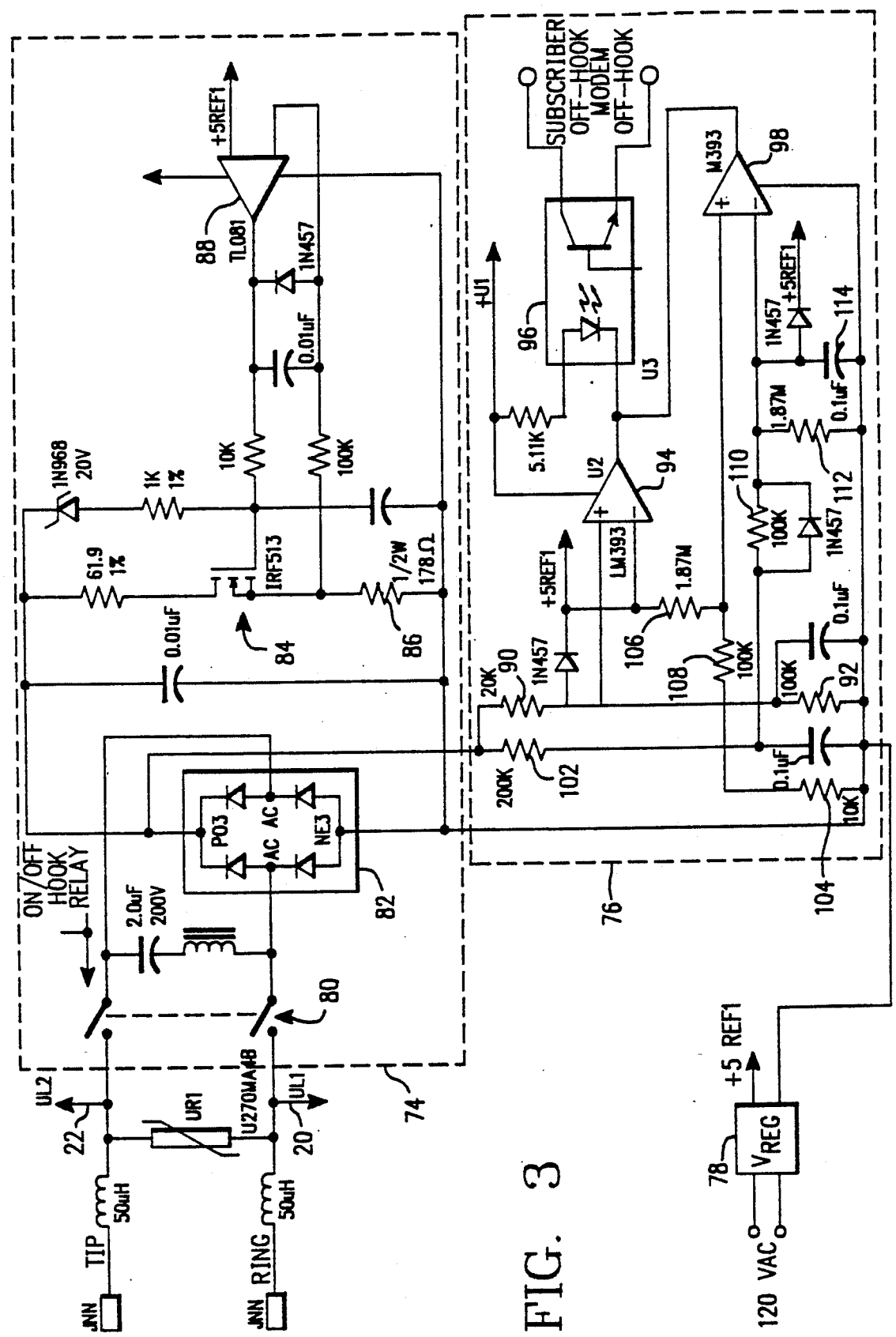
FIG. 3 is a circuit diagram of a preferred embodiment of a second circuit arrangement of the unit according to the present invention.

The second circuit unit employed in a system according to the present invention is illustrated in FIG. 3. This circuit unit is also connected to conductors 20 and 22 and is composed of a load unit 74, a detection unit 76 and regulated DC power supply 78. Unit 74 is connected to conductors 20 and 22 via a relay switch 80 which is controlled by relay drive circuitry 8 of FIG. 1. In certain applications, it may be preferable for a relay switch 80 to be composed of only a single switch connected to conductor 20, with the other switch being replaced by a fixed connection to conductor 22. Such an arrangement would help to meet FCC balance requirements.

Load unit 74 is composed essentially of a full wave rectifier bridge 82 having its AC inputs connected to conductors 20 and 22 when relay switch 80 is closed. A full wave rectifier is used primarily to assure proper operation of the circuit regardless of the polarity relation between voltages UL1 and UL2, i.e., to allow for the possibility of the connections of conductors 20 and 22 being reversed. Unit 74 further includes a transistor 84, a resistor 86, and a differential amplifier 88 which, along with the other components illustrated in FIG. 3, form a constant current source which will draw at least 26 mA from conductors 20 and 22 as long as switch 80 is closed.

Amplifier 88 has a noninverting input connected to receive a +5 V DC reference signal and an inverting input connected to receive the voltage across resistor 86. The output of amplifier 88 operates to control the conduction state of transistor 84 in a manner to maintain the voltage drop across resistor 86 substantially equal to five volts. As long the voltage across resistor 86 has this value, 26 mA will be flowing through the series path containing transistor 84 and resistor 86.

Load unit 74, by drawing a constant direct current, additionally serves to minimize the attenuation of the AC signal components appearing between conductors 20 and 22.

When relay switch 80 is closed, the voltage across bridge 82 corresponds to $|UL1-UL2|$, although a typical full wave rectifier bridge will introduce a voltage drop of the order of 1.5 V.

The voltage appearing at the output of bridge 82 is supplied to detection unit 76, which will monitor this voltage according to two criteria in order to determine whether, after a data transmission system of the type contemplated by the present invention is actively connected to the telephone line, another instrument connected to the line has been actively connected, i.e., has gone off-hook.

According to the present invention, the two criteria employed are whether $|UL1-UL2|$: has dropped below 8 volts; or has suddenly decreased by 5 volts. It has been determined that a test based on these two criteria will provide a reliable indication that another instrument connected to the telephone line has been activated.

For monitoring the magnitude of UL1−UL2, a first voltage divider composed of resistors 90 and 92 is connected across the output of bridge 82 and the center tap of this voltage divider is connected to the noninverting input of a differential amplifier, or comparator, 94. Differential amplifier 94 is of a type whose output assumes ground potential when the potential at its inverting input is more positive than the potential at its noninverting input. With the circuit arrangement illustrated in FIG. 3, a positive reference voltage, REF1, in the illustrated embodiment having a magnitude of +5 V, is applied to the inverting input of amplifier 94. Therefore, the output of amplifier 94 will be at ground potential when the potential at its noninverting input drops below +5 V. In the illustrated embodiment, resistors 90 and 92 create a voltage division ratio such that when the voltage across the output of bridge 82 has a value of 6 V DC, the voltage at the noninverting input of amplifier 94 will equal +5 V DC. Moreover, if bridge 82 produces a voltage drop of 1.5 V, then an output voltage of 6 V DC will correspond to a DC voltage of 7.5 V between conductors 20 and 22, which basically satisfies the first criterion set forth above.

The output of amplifier 94 is connected to the input of an optoelectronic isolator 96 so that when the output of amplifier 94 is at ground potential, light will be emitted by the photodiode of isolator 96, causing isolator 96 to produce an output signal indicating that both the modem which forms part of the data communication system and some other instrument connected to the telephone line are off-hook. It will be appreciated that the circuit illustrated in FIG. 3 does not operate unless the modem is off-hook, since only then will relay switch 80 be closed.

Detection of a sudden decrease in the output voltage across bridge 82 is performed by a circuit arrangement which includes a further differential amplifier 98 which functions in the same manner as amplifier 94. A second voltage divider composed of resistors 102 and 104 is connected across the output of bridge 82, and a third voltage divider composed of resistors 106 and 108 is connected between a point at the DC reference voltage, REF1, and the point of connection between resistors 102 and 104. The point of connection between resistors 106 and 108 is connected to the noninverting input of amplifier 98 so that the voltage applied t the noninverting input of amplifier 98 will vary with, and be slightly greater than, the voltage at the point of connection between resistors 102 and 104. More specifically, the voltage applied to the noninverting input of amplifier 98 will be equal to the difference between VREF1 and the voltage at the center tap between resistors 102 and 104, multiplied by the dividing ratio of the voltage divider constituted by resistors 106 and 108 which, in the illustrated embodiment, has a value of the order of 0.05. The voltage at the point of connection between resistors 102 and 104 is additionally supplied to a further voltage divider composed of resistors 110 and 112, with the point of connection between those resistors being connected to the inverting input of amplifier 98. The resistance values for resistors 110 and 112 are selected so that the voltage applied to the inverting input of amplifier 98 is, in the absence of a sudden voltage change, only slightly less than that appearing at the point of connection between resistors 102 and 104. By way of example, voltage divider 110, 112, could have a dividing ratio of the order of 0.95. A capacitor 114 connected in parallel with resistor 112 acts to delay any changes in the voltage across resistor 112 for a selected period of time.

Thus, under steady state conditions, the voltage at the noninverting input of amplifier 98 will be slightly greater than the voltage at the inverting input. However, if the output voltage of bridge 82 should decrease suddenly by a sufficient magnitude, for example of the order of 5 volts, the voltage at the noninverting input of amplifier 98 will decrease proportionately, while, for a short period of time, for example of the order of 180 msec, the voltage applied to the inverting input of amplifier 98 will remain substantially constant. If the voltage drop is sufficiently large, the voltage at the noninverting input will become less positive than that at the inverting input, so that the output of amplifier 98 will be placed at ground potential, having an effect similar to that produced by amplifier 94.

The output signals from the circuits of FIGS. 2 and 3 are supplied to the microcomputer system 2, which performs the following sequence of operations.

When a data transfer is to be effected, the circuit of FIG. 2 is interrogated to verify that all of the instruments connected to the telephone line are on-hook and no call is arriving. If this condition is verified, a data communication session is initiated.

During the course of that session, the circuit of FIG. 3 is interrogated to determine whether another instrument connected to the line has been taken off-hook. Preferably, this interrogation is performed at regular intervals, for example once every 10 msec, and a determination is made that another instrument has been taken off-hook if the signal from the circuit of FIG. 3 is present during three successive interrogations. This enables any signal developed by the circuit of FIG. 3 to be debounced, so that the system will not respond to spurious off-hook indications. In further accordance with the invention, after the off-hook signal has been detected during three measuring cycles, the output from the circuit of FIG. 3 can continue to be monitored for a selected period of time before the data transmission is terminated. This prevents unnecessary termination if an off-hook signal is in fact created by a telephone line switching transient which is longer than the first measuring time interval.

If a valid indication that another instrument has been taken off-hook is developed, the communication system immediately disconnects from the telephone line to make it available to the subscriber.

A new data transfer can then be initiated at a selected future time.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a system for transmitting data via a telephone line, which system includes a data communications device connectable to the telephone line for transmitting the data, at least one other communications device being connected to the telephone line and each device being switchable between an inactive state, in which the device is not in use and presents a high impedance to the telephone line, and an active state, in which the device reduces the telephone line voltage and signals can be transferred between the device and the telephone line, the improvement wherein: said system further comprises telephone line state detection means associated with said data communications device and connected to the telephone line for electrically monitoring the telephone line to provide an indication of the state of another communications device connected to the telephone line, and control means connected for controlling the connection of said data communications device to the telephone line; and said detection means comprise a switch which is controlled by said control means to be closed when said communications device is connected to the telephone line, a first circuit having an input connected to the telephone line via said switch and having means for supplying an output signal to said control means when said switch is closed and the voltage on the telephone line is below a selected value, and a further circuit having an input connectable to the telephone line via said switch and having means for supplying an output signal to said control means when said switch is closed and the voltage on the telephone lien decreases by a predetermined amount in a selected time interval.

2. A system as defined in claim 1 wherein said detection means comprise a second circuit having a voltage input connected to the telephone line for supplying an output signal to said control means if another device connected to the telephone line is in its active state.

3. A system as defined in claim 2 wherein said second circuit comprises means for producing the output signal when said data communications device is in its inactive state and the voltage on the telephone line is below a first selected value.

4. A system as defined in claim 3 wherein said detection means comprise a third circuit having a voltage input connected to the telephone line for supplying an output signal to said control means in response to a calling signal on the telephone line.

5. A system as defined in claim 1 further comprising means defining a constant current load connectable to the telephone line via said switch.

6. A system as defined in claim 1 wherein said detection means comprise a second circuit having a voltage input connected to the telephone line for supplying an output signal to said control means in response to a calling signal on the telephone line.

7. A system as defined in claim 1 wherein said mean for supplying an output signal comprise comparison means connected for effecting a comparison between the voltage on the telephone line and a fixed reference voltage having a value corresponding to the selected value.

* * * * *